(12) United States Patent
Menon et al.

(10) Patent No.: US 11,855,934 B2
(45) Date of Patent: Dec. 26, 2023

(54) CHATBOT WITH SELF-CORRECTION ON RESPONSE GENERATION

(71) Applicant: Genpact Luxembourg S.à r.l. II, Luxembourg (LU)

(72) Inventors: Sreekanth Menon, Bangalore (IN); Prakash Selvakumar, Bangalore (IN); Varsha Rani, Gurgaon (IN)

(73) Assignee: Genpact Luxembourg S.à r.l. II, Luxembourg (LU)

(*) Notice: Subject to any disclaimer, the term of this patent is extended or adjusted under 35 U.S.C. 154(b) by 78 days.

(21) Appl. No.: 17/546,942

(22) Filed: Dec. 9, 2021

(65) Prior Publication Data

US 2023/0188480 A1 Jun. 15, 2023

(51) Int. Cl.
*H04L 51/02* (2022.01)
*G06F 40/30* (2020.01)
*G06N 20/00* (2019.01)

(52) U.S. Cl.
CPC .............. *H04L 51/02* (2013.01); *G06F 40/30* (2020.01); *G06N 20/00* (2019.01)

(58) Field of Classification Search
None
See application file for complete search history.

(56) References Cited

U.S. PATENT DOCUMENTS

| | | | |
|---|---|---|---|
| 10,599,885 B2 | 3/2020 | Galitsky | |
| 10,929,781 B1* | 2/2021 | Choque | G06N 20/00 |
| 2018/0053119 A1 | 2/2018 | Zeng et al. | |
| 2018/0329884 A1 | 11/2018 | Xiong et al. | |
| 2021/0067470 A1* | 3/2021 | Freed | G06F 18/23 |
| 2022/0027768 A1* | 1/2022 | Rosu | G06N 5/045 |
| 2022/0156298 A1* | 5/2022 | Mahmoud | G06F 16/9535 |
| 2022/0383153 A1* | 12/2022 | Mahmoud | G06N 5/04 |

FOREIGN PATENT DOCUMENTS

| | | | | |
|---|---|---|---|---|
| WO | 2017180286 A1 | 10/2017 | | |
| WO | WO-2020144636 A1 * | 7/2020 | | G06F 16/3329 |

\* cited by examiner

*Primary Examiner* — Natisha D Cox
(74) *Attorney, Agent, or Firm* — Goodwin Procter LLP

(57) ABSTRACT

A method and system for generating and correcting chatbot responses based on reinforcement learning (RL) are disclosed. In some embodiments, the method includes receiving user data associated with a user in a chatbot conversation. The method includes providing a first recommendation to the user. The method includes detecting user feedback to the first recommendation in the chatbot conversation. The method then includes determining whether to assign a positive reward or a negative reward to the user feedback based on sentiment analysis performed on the user feedback. If the negative reward is assigned to the user feedback, the method further includes calculating a negative reward score for the first recommendation; retraining the one or more of RL models using one or more of the negative reward score, the user data, the first recommendation, and the user feedback; and determining a second recommendation using the one or more retrained RL models.

20 Claims, 15 Drawing Sheets

| Agent | User | Intent | Slot | Reward |
|---|---|---|---|---|
| hi, how can I help you? | I want to book a resort | request_vacation | | |
| when you want to come here? start date? | on Monday 5 march | | check in | |
| for how many days? Checkout date? | till Sunday | | check out | |
| how many members are with you? | 2 adults 1 child | | members in | |
| What type of resort you prefer? | abc | | resort type | |
| which one you prefer, we have these options. Resort option1 Resort option2 Resort option3 Resort option4 | resort option 1 | | resort option | |
| can you confirm? here are price details | yes | booking | resort option | |
| Congrats! We have booked "resort option1" from 5 March to 11 March for 3 members. | | user feedback | | Update the Reward (x,1) |

Figure 6B

| Agent | User | Intent | slot | Reward |
|---|---|---|---|---|
| can you confirm? here are price details | | booking | | |
| | I prefer to have additional room | user_feedback | | Update the reward (x, -1) ~852 |
| Okay, we have these option based on your choice. <br><br> 1. Resort option3 ~854 <br> 2. Resort option2 <br> 3. Resort option4 | | | | |
| | yes | user_feedback | | Update the reward (x, 1) ~856 |
| Congrats! We have booked "resort option3" from 5 March to 11 March for 3 members. | | | | |
| | Thank you. | | | |

CHATBOT WITH SELF-CORRECTION ON RESPONSE GENERATION

TECHNICAL FIELD

This disclosure relates to a method and system for generating and correcting chatbot responses based on continuously learning from user feedback using reinforcement learning (RL) modelling.

BACKGROUND

A chatbot is a software program that simulates a conversation with a human being through an electronic communication device a smartphone) associated with a user. The online conversation of a chatbot can be conducted via text or text-to-speech with a virtual intelligence agent in lieu of a live human agent. The chatbot aims at providing an improved user experience such as a quick resolution of a customer question, quick provision of requested service (e.g., booking a ticket), etc. The chatbot also seeks to facilitate a business transaction (e.g., a product sale).

Enterprises today have developed conversational interfaces such as chatbots to adapt to fast-grown business needs, but many customers/users still prefer to talk to a human agent (e.g., a sales representative) rather than a virtual agent with bot/machine intelligence at a customer service portal. First, chatbots currently deployed in enterprise settings are narrow and customized to a specific domain. These chatbots are not designed to recognize and understand the underlying context of a conversation, let alone generating responses that satisfy user goals. Also, although most enterprise chatbots are trained based on supervised learning techniques that map dialogues to responses, there is often a lack of labelled samples and annotated data to train machine learning (ML) models. Without sufficient training data samples for the ML models, the chatbots are not intelligent enough to provide a pleasant experience for the user. Further, when a conversation is driven as per user preference to achieve a desired goal for the user, the existing chatbots may not perform well. In addition, it is infeasible to retrain the current chatbot models with every change of user choice/option over time.

SUMMARY

To address the aforementioned shortcomings, a method and a system for generating and correcting chatbot responses based on continuously learning from user feedback using RL modelling are provided. The method receives user data associated with a user in a chatbot conversation. The method then provides a first recommendation to the user based on the user data and one or more RL models. The method also detects user feedback from the user to the first recommendation in the chatbot conversation. The method determines whether to assign a positive reward or a negative reward to the user feedback based on sentiment analysis performed on the user feedback. Responsive to assigning the negative reward to the user feedback, the method further calculates a negative reward score for the first recommendation; retrains the one or more RL models using one or more of the negative reward score, the user data, the first recommendation, and the user feedback; and determines a second recommendation using the one or more retrained RL models.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

FIG. 6B is an example illustration of the basic conversation flow depicted in FIG. 6A, according to some embodiments.

FIG. 8B is an example illustration of an RL-based conversation learning flow depicted in FIG. 8A, according to some embodiments

DETAILED DESCRIPTION

Figure 1:
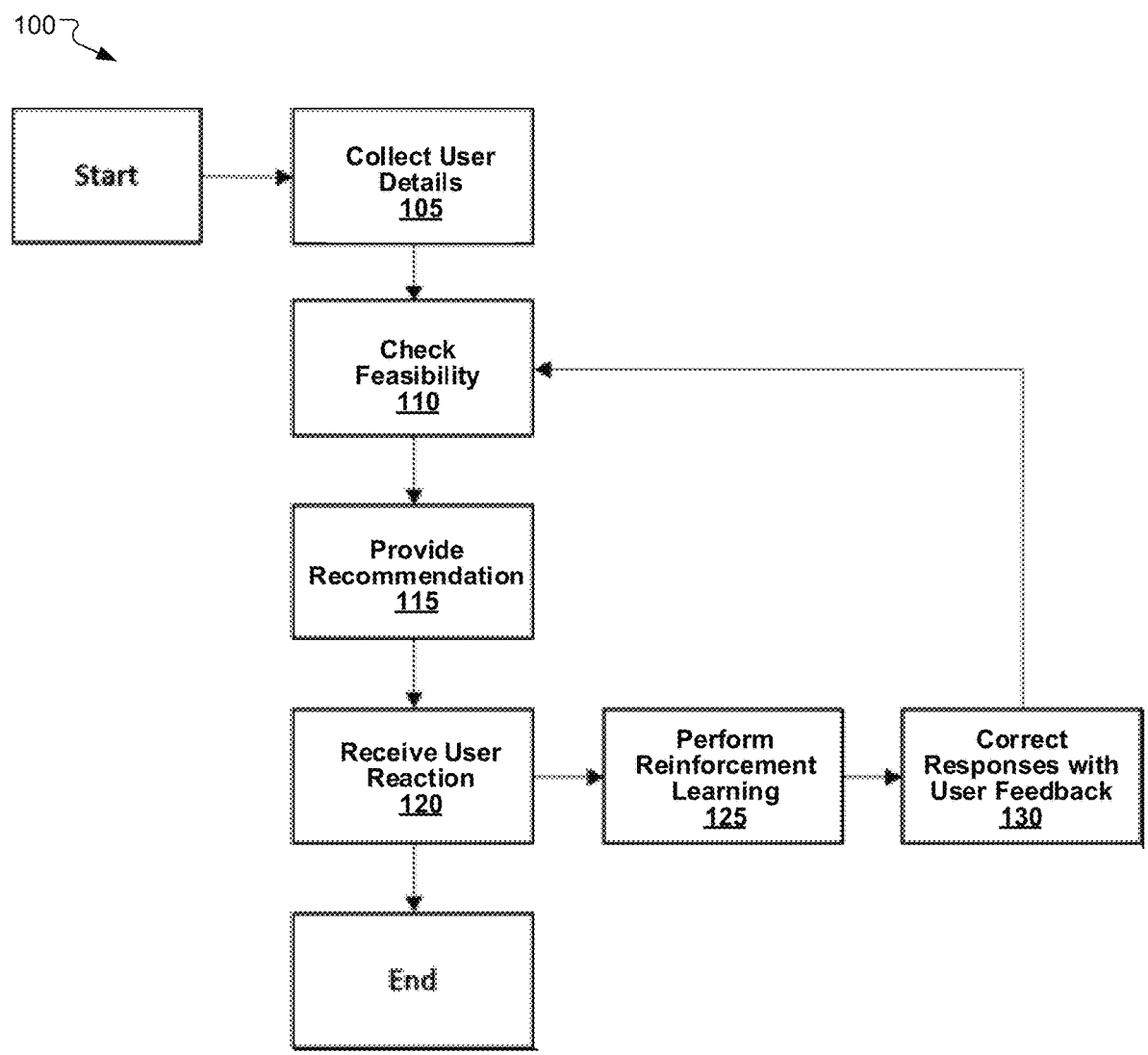
FIG. 1 illustrates an exemplary high-level process for generating chatbot responses with self-correction capability, according to some embodiments.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Conventionally, a chatbot is created by training a model on question & answer datasets to provide answers to certain generic questions. The chatbot may include a natural language understanding (NLU) unit that is trained using supervised ML techniques. A supervised ML model may be trained over conversational datasets using sequence-to-sequence (Seq2Seq) based techniques. As a result, responses are mapped to corresponding dialogs and generated for a user. However, since the conventional chatbot implementations simply extract the information and perform a basic parsing without capturing contexts from conversations with customers, the responses are not tailored or customized to customers. For example, the existing chatbot may recommend a roller coaster amusement park to an inquiring user who is 80 years old.

An additional drawback is that existing chatbots do not take user preferences into account when generating responses or recommendations. A chatbot currently provides a response from a set of predefined responses for all users who made the same or similar set of queries. Therefore, even if a user said he did not like "exciting" sports in the conversation, the chatbot may still recommend the roller coaster amusement park to him.

One of the core uses of a chatbot in business contexts is to provide customer service, where a virtual agent replaces or augments a human agent and drives the conversation towards a specific goal. The current chatbot implementation approaches (e.g., regex match, hand-coded rules) may not adapt to goal-driven conversations. For example, for every given query from an end-user, there is no single best response from current chatbot agents that can drive any conversation to any end goal, because user preferences vary over time and in different situations.

To address the above technical problems, the present disclosure offers a solution by using an enterprise-wide, scalable RL-based chatbot that is trained through trial-and-error conversations with user simulators. This technical solution is particularly advantageous in that the RL-based chatbot has a self-correction capability when generating a response or recommendation to reach an end goal.

RL is a branch of Artificial Intelligence (AI) where a solution to a problem is developed by allowing an algorithm to learn what to do in different situations by maximizing a numerical reward for each attempted action. A sequential decision is made in RL where each output depends on the state of current input and action being taken. RL benefits from learning through trial and error. The RL-based chatbot described in the present disclosure is trained to understand contextual knowledge of chatbot conversations through continuous learning and retraining from user feedback. The RL-based architecture described herein ensures that changes in user preferences over time are counted for and options/suggestions are provided based on user experience. Further, the RL-based chatbots can help users to achieve a specific end goal (e.g., booking a ticket) and generate a response/recommendation based on the end goal to drive the conversation accordingly.

Advantageously, the present disclosure provides an RL-based chatbot solution that is continuously retrained and enhanced with user feedback to improve the efficiency of communication or information search and discovery using chatbot conversations. The technical solution described herein captures the change or variations of user behaviors (e.g., user choices, user preferences) over time and retrains the chatbot models with the captured changes, while this is infeasible in current chatbot systems. The technical solution can detect positive or negative sentiment contexts from users in the conversations and change the generated recommendations over time based on the detected contexts. For example, the weight of a recommendation in one or more RL models can be increased or decreased to reflect the influence of the sentiment context. A recommendation with a negative reward will eventually be wiped out when it is weighted down to zero.

The technical solution also benefits in ensuring more users leave chatbot conversations with positive notes. The technical solution drives a conversation in a manner that maximizes the probability of a goal being achieved in the conversation. Therefore, user experience in using a chatbot is improved. Users will not divert to other systems to look for an answer that meets their goals. As a result, computer resources (e.g., processing time, memory) and network resources (e.g., network traffic, bandwidth) otherwise used in searching the answer can be reduced. By automatically self-correcting errors, the technical solution further improves the accuracy of responses and increases the reliability of the system. By accommodating on-the-fly user feedback, the technical solution is flexible and efficient.

Overall Self-Correcting Chatbot Response Generation

FIG. 1 illustrates an exemplary high-level process 100 for generating chatbot responses with self-correction capability, according to some embodiments. Advantageously, the present disclosure provides a flexible artificial intelligence (AI) approach to generate and adjust chatbot responses through retraining RL model(s) and continuously learning from user feedback. At the first operation 105 of FIG. 1, user details/data are collected. The user details may include any data that a user enters in a chatbot conversation with a virtual agent. The chatbot agent is an AI program that interacts with the user (e.g., via questions & answers) in the conversation. The chatbot agent (e.g., representing a service provider) helps a user to achieve a specific goal. The user details usually include information/answers of user intent, preferences, and other information that relate to achieving the specific goal.

At operation 110, the feasibility of a response/choice is checked. If the user has a feasible choice/option, the chatbot just acts on the choice. For example, if the user wants to call a cab at 9 pm, then the chatbot ensures that a cab driver takes the order and picks up the user at 9 pm. However, if the user does not have a feasible choice, at operation 115, the chatbot needs to provide a recommendation to the user based on the collected user details. For example, if the user asks for a cab after a concert ends, the chatbot may recommend a cab service at 9:30 pm based on information from prior conversations (e.g., when the concert may end, how long a cab may arrive at the stadium). At operation 120, the chatbot receives a user reaction to the recommendation. The reaction or feedback can be positive or negative. The feedback can be implicitly or explicitly expressed by the user in the conversation. The identification of the feedback will be described below in detail with reference to FIGS. 5 and 8A.

The present disclosure adds an RL mechanism at operation 125 to detect the user reaction or feedback and use the detected feedback to train one or more ML models. To promote recommendations and improve user experience, negative feedback is of particular interest in RL modelling. There are a variety of reasons why a user does not like the recommendation provided by the chatbot. The chatbot is trained based on the user's answers. If an anomaly appears in the user's answer, the chatbot agent may not understand the context and provide the user an appropriate recommendation on the fly. Also, the user's behaviors including user answers or user preferences may be affected by environmental factors (e.g., climate, political) or simply vary over time. For example, the recommendation of a swimming pool may no longer satisfy users during a pandemic. It is challenging to capture the factors and/or variations in an ongoing conversation. In existing chatbot systems, one or more of detecting the feedback and variation/parameters, circulating newly detected data into ML models, and retraining the models are manually performed (e.g., by an analysis).

The reinforcement learning at operation 125 can convert the detected answers and feedback to the knowledge of the ML models to train the ML models. Every suggestion, option, answer that customers entered in a conversation will be captured in real-time by the RL mechanism as a new pattern to learn and train. As a result, the chatbot can understand new answers, suggestions, options from users in subsequent conversations, and, in turn, provide more meaningful responses to the users. In this way, the chatbot corrects responses/recommendations with user feedback as depicted at operation 130. It should be noted FIG. 1 is merely an exemplary illustration of a self-correcting response generation process, operations may be added and/or removed within the spirit and the scope of this disclosure.

Figure 2:
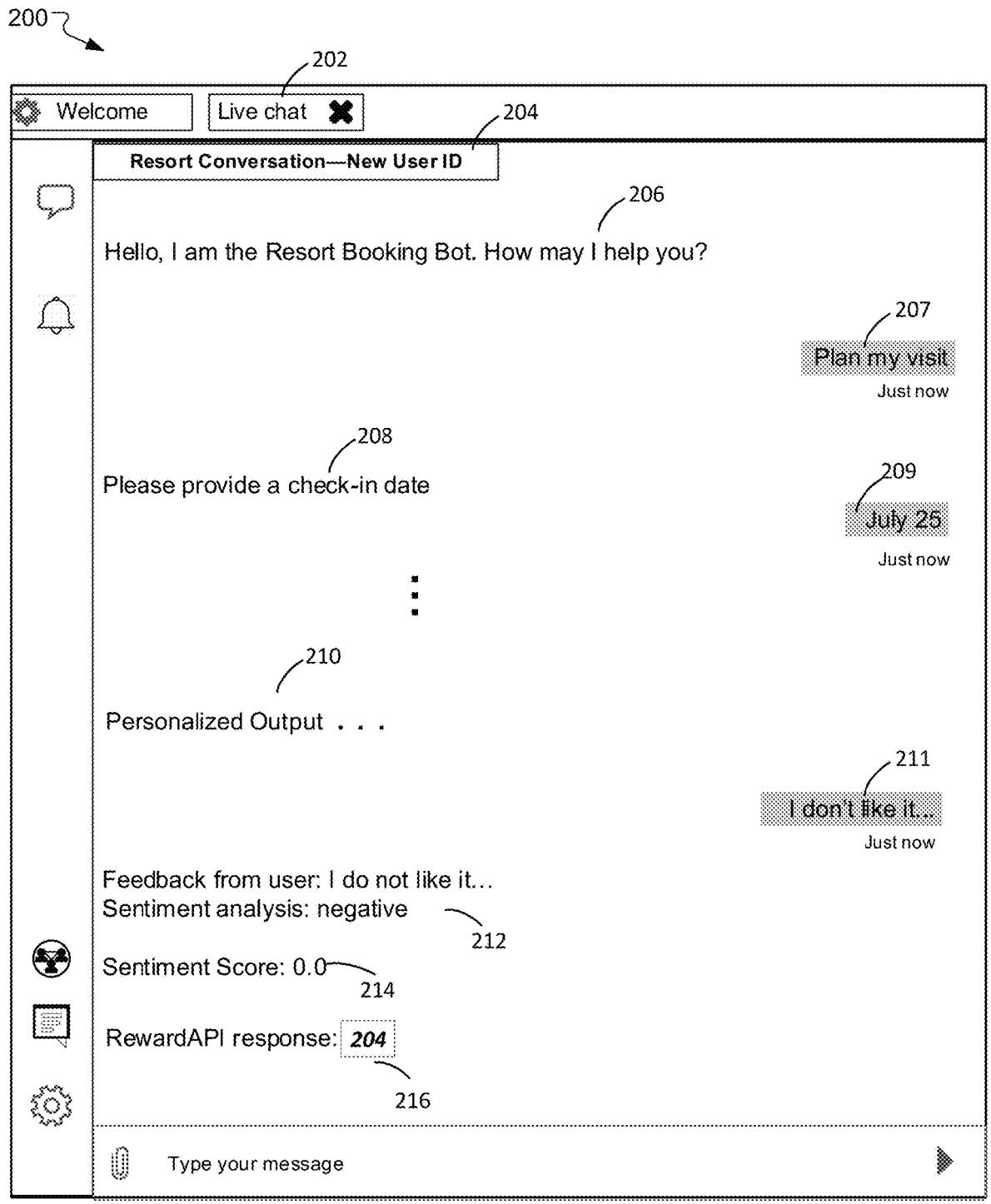
FIG. 2 illustrates an exemplary user interface of an RL-based chatbot conversation, according to some embodiments.

FIG. 2 shows an exemplary user interface 200 of an RL-based chatbot conversation, according to some embodiments. User interface 200 includes a live chat 202 with a new user about a resort topic 204. The chat messages from the chatbot agent are shown on the left side of user interface 200 and labelled with even numbers, while the chat messages from the user are shown in darker boxes on the right side of user interface 200 and labelled with odd numbers. As depicted, the chatbot agent usually asks questions (e.g., 206, 208) to collect information via answers from the user (e.g., 207, 209). In this example, the user wants to plan a visit to a resort and wishes to obtain suggestions from the chatbot. Since the user does not have a specific plan, the chatbot generates a response or recommendation (i.e., personalized output 210) for the user based on the information provided by the user. However, as indicated in 211, the user may not like recommendation 210. Based on this feedback, the chatbot may perform sentiment analysis 212 and reinforcement learning to determine a sentiment score 214 and a reward score 216. Here, the example scores are respectively 0 and 204. These numerical scores, feedback, and other information (e.g., a weight associated with the feedback) are added to one or more RL models for training. A continuous learning based on the training of feedback will then reflect in the subsequent improved response generation.

Computer Implementation

Figure 3:
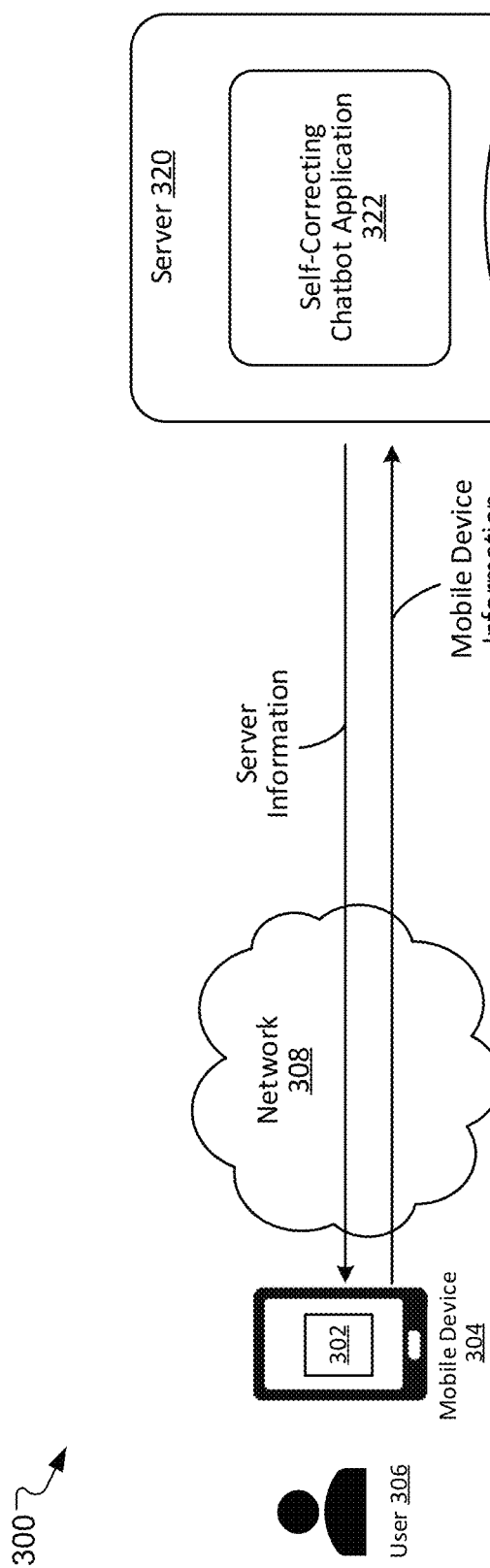
FIG. 3 is a system for generating and self-correcting chatbot responses, according to some embodiments.

FIG. 3 is a system 300 for generating and self-correcting chatbot responses, according to some embodiments. By way of example and not limitation, the methods described herein (e.g., process 100 in FIG. 1) may be executed, at least in part, by a software application 302 running on mobile device 304 operated by a user or customer 306. By way of example and not limitation, mobile device 304 can be a smartphone device, a tablet, a tablet personal computer (PC), or a laptop PC. In some embodiments, mobile device 304 can be any suitable electronic device connected to a network 308 via a wired or wireless connection and capable of running software applications like software application 302. In some embodiments, mobile device 304 can be a desktop PC running software application 302. In some embodiments, software application 302 can be installed on mobile device 304 or be a web-based application running on mobile device 304. By way of example and not limitation, user 306 can be a person that intends to achieve a specific goal such as requesting a service, conducting a transaction, seeking an answer for a question, etc. The user can communicate with server 320 via software application 302 residing on mobile device 304 to receive responses from chatbot(s) that meet his/her specific goal or needs.

Network 308 can be an intranet network, an extranet network, a public network, or combinations thereof used by software application 302 to exchange information with one or more remote or local servers, such as server 320. According to some embodiments, software application 302 can be configured to exchange information, via network 308, with additional servers that belong to system 300 or other systems similar to system 300 not shown in FIG. 3 for simplicity.

In some embodiments, server 320 is configured to store, process and analyze the information received from user 306, via software application 302, and subsequently transmit in real time processed data back to software application 302. Server 320 can include a self-correcting chatbot application 322 and a data store 324, which each includes a number of modules and components discussed below with reference to FIG. 4. Server 320 can also include a chatbot agent to provide chatbot service, and self-correcting chatbot application 322 is part of the chatbot agent. According to some embodiments, server 320 performs at least some of the operations discussed in the methods described herein (e.g., process 100 in FIG. 1). In some embodiments, server 320 can be a cloud-based server.

Figure 4:
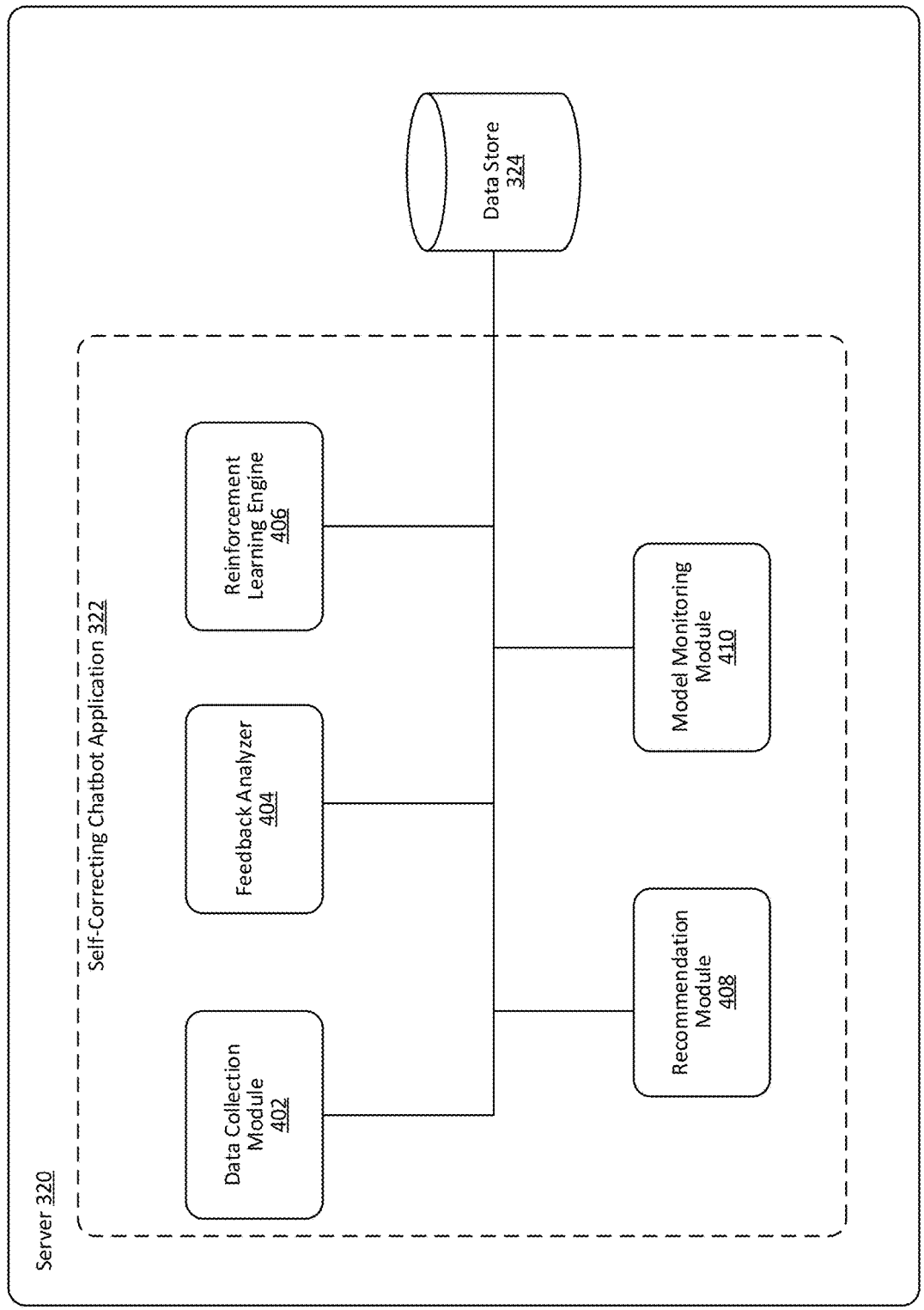
FIG. 4 is a server used as part of a system for generating and self-correcting chatbot responses using the methods described herein, according to some embodiments.

In some embodiments, FIG. 4 depicts selective components of server 320 used to perform the functionalities described herein, for example, operations of process 100. Server 320 may include additional components not shown in FIG. 4. These additional components are omitted merely for simplicity. These additional components may include, but are not limited to, computer processing units (CPUs), graphical processing units (GPUs), memory banks, graphic adaptors, external ports and connections, peripherals, power supplies, etc., required for the operation of server 320. The aforementioned additional components, and other components, required for the operation of server 320 are within the spirit and the scope of this disclosure.

In the illustrated embodiment of FIG. 4, server 320 includes a self-correcting chatbot application 322 and a data store 324. Self-correcting chatbot application 322 in turn includes one or more modules responsible for processing and analyzing the information received by server 320. For example, the modules in self-correcting chatbot application 322 may have access to the chat messages from user 306 in a chatbot conversation, and generate a response based on the intent and context identified from the received chat messages. Typically, self-correcting chatbot application 322 is part of the chatbot agent residing on server 320.

In some embodiments, self-correcting chatbot application 322 of server 320 includes a data collection module 402, a feedback analyzer 404, a reinforcement learning (RL) engine 406, a recommendation module 408, and a model monitoring module 410. In some embodiments, self-correcting chatbot application 322 of server 320 may include only a subset of the aforementioned modules or include at least one of the aforementioned modules. Additional modules may be present on other servers communicatively coupled to server 320. For example, recommendation module 408 and a model monitoring module 410 may be deployed on separate servers (including server 320) that are communicatively coupled to each other. All possible permutations and combinations, including the ones described above, are within the spirit and the scope of this disclosure.

In some embodiments, each module of self-correcting chatbot application 322 may store the data used and generated in performing the functionalities described herein in data store 324. Data store 324 may be categorized in different libraries (not shown). Each library stores one or more types of data used in implementing the methods described herein. By way of example and not limitation, each library can be a hard disk drive (HDD), a solid-state drive (SSD), a memory bank, or another suitable storage medium to which other components of server 320 have read and write access.

Although not shown in FIG. 4, server 320 may include an AI manager to provide a chatbot platform for users, a user interface engine to generate chatbot user interfaces for display on the mobile device 304, etc. For simplicity and clarity, these backend supporting components will not be described separately in this disclosure. Also, various functionalities performed by self-correcting chatbot application 322 of server 320 in communication with mobile device 304 as well as other components of system 300 will mainly be described in accordance with the architecture shown in FIG. 5 and with reference to other FIGS. 6A-10.

Self-Correcting Chatbot Response Generation

Figure 5:
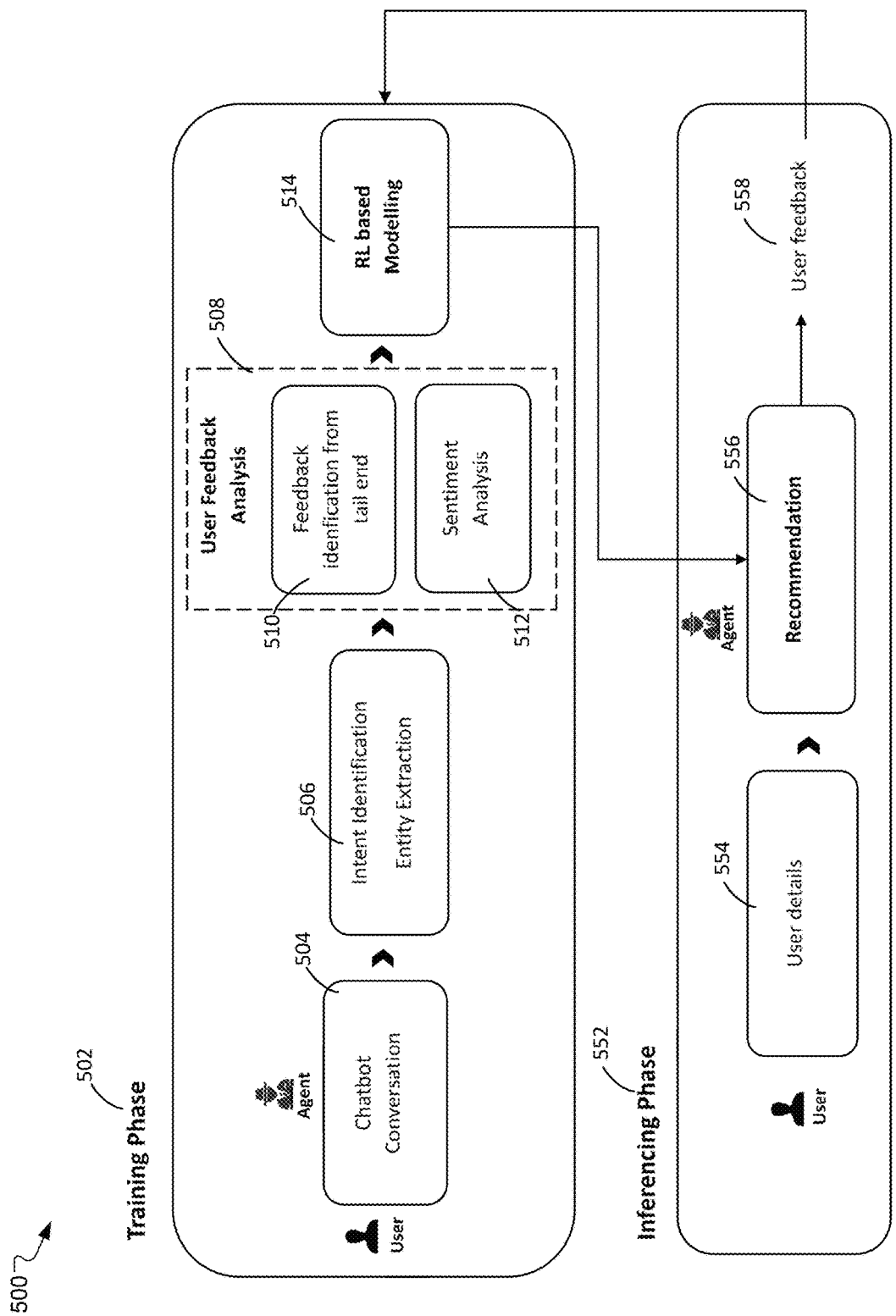
FIG. 5 illustrates an example architecture for generating chatbot responses with self-correction capability, according to some embodiments.

FIG. 5 illustrates an example architecture 500 for generating chatbot responses with self-correction capability, according to some embodiments. In this architecture, a training phase 502 and an inferencing phase 552 are included. In training phase 502, one or more RL models are trained based on user experience data associated with the user. The user experience data may include data from every conversation between the user and the chatbot agent, which is tracked and analyzed throughout the chatbot training by self-correcting chatbot application 322. In inferencing phase 552, the continuous training of RL models is used to adjust or correct the responses/recommendations presented to the user.

A chatbot is a communication channel that helps a chatbot agent (e.g., a service provider) to interact with end-users and provides an answer or a solution that achieves a specific goal of a user. The chatbot agent or agent handles the conversations with the end-users through various components of self-correcting chatbot application 322. As depicted in FIG. 5, the chatbot conversation processing starts at operation 504, where data collection module 402 of self-correcting chatbot application 322 collects user details that a user shared in a chatbot conversation. The user details or user data can be any data that the user voluntarily offered in the conversation or data that the user replied to questions from the agent.

In some embodiments, data collection module 402 includes a natural language understanding (NLU) unit for processing the user data collected in the conversation. The NLU unit can convert the collected user data into structured data and understand the nuances of human language. At operation 506, data collection module 402 can identify an intent of the user and extract entities from the conversation using the NLU unit.

An intent can be classified as an end user's intention for one conversation turn. A conversation turn includes simple back and forth alternations between the user and the agent. A turn occurs when one party speaks and another follows, or vice versa. Data collection module 402 identifies the intent using intent classifiers based on machine learning. In some embodiments, a set of phrases can be defined regarding what users may speak about an intent. Upon tagging the intent to the set of phrases, data collection module 402 can train the ML models to identify similar words and expand the tagging to unknown conversation instances. For example, if a user says "Find a place to stay in San Francisco tonight" or "I need accommodations for this weekend in Denver," data collection module 402 may determine the intent to be "Need Hotel" from tagging and classifying these similar phrases. In some embodiments, data collection module 402 can train different classification models and ensemble the models into one classifier that outperforms an individual classifier.

Entities are objects (e.g., parameters, replies, choices) associated with the occurrence of the conversation. For example, when the intent is "Need Hotel," data collection module 402 can extract the objects including parameters related to booking a hotel such as location, date, price range, brand preference, etc. In some embodiments, data collection module 402 tags a few entities and trains ML models (e.g., Seq2Seq based models) such that these models can automatically extract more entities from a new set of chatbot conversations. In some embodiments, data collection module 402 represents entities by slots and associated values as shown below in FIG. 6B.

In some embodiments, data collection module 402 can store the identified intent and extracted entities in a database, for example, by filling into a form stored in data store 324. When a conversation is progressing, the agent will keep interacting with the user by asking questions and receiving replies from the end-user for multiple conversation turns. Therefore, data collection module 402 can extract replies, parameters, and other objects (i.e., entities), and update the form with the extracted entities on the fly. Based on these entities and corresponding intent, data collection module 402 can communicate with recommendation module 408 (described below) to identify the next set of actions. The user can respond to each of the set of actions. For example, multiple options/choices can be provided to a user and the user can return his/her feedback or selection of choice.

Figure 6A:
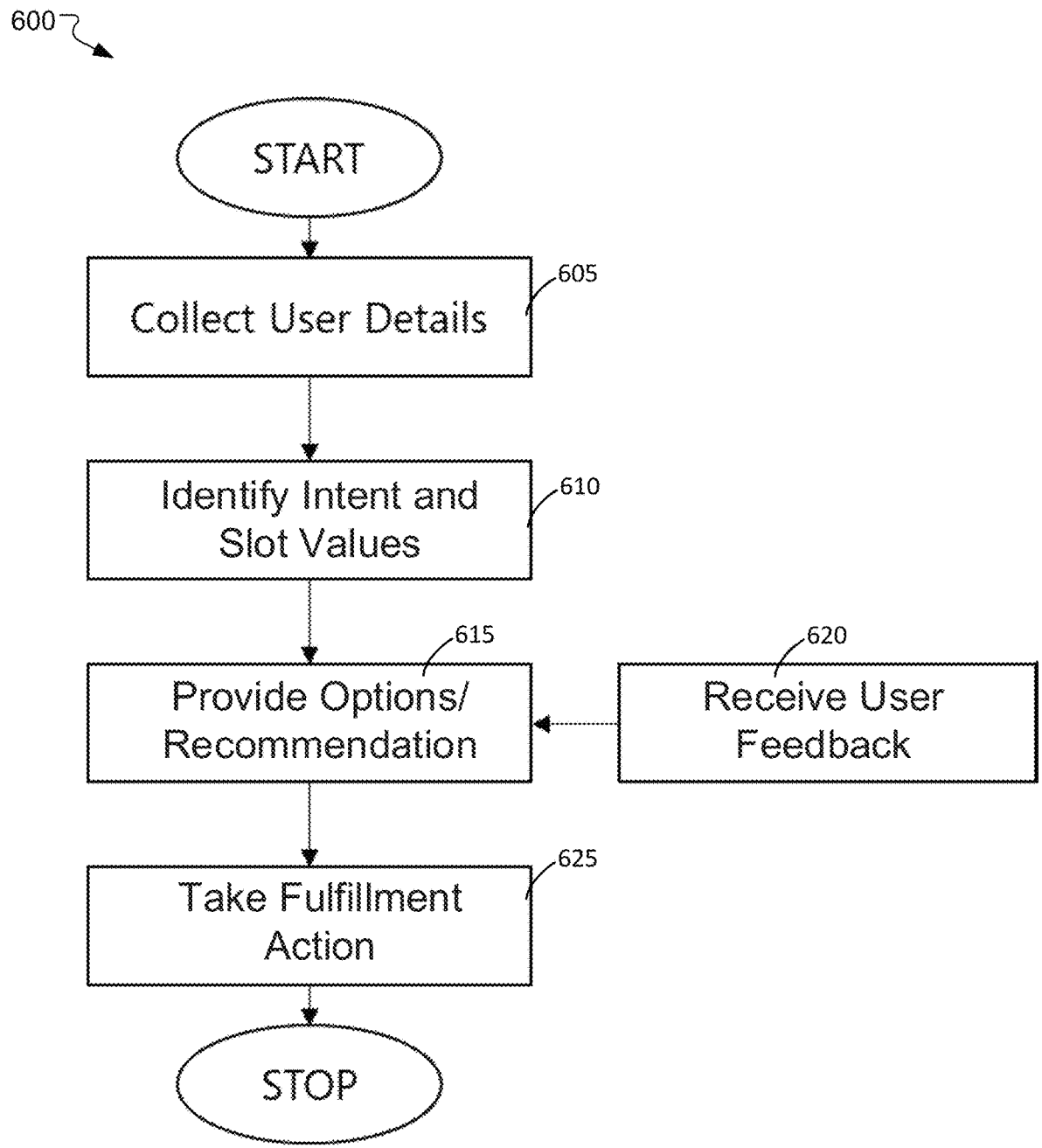
FIG. 6A is a basic flow of a chatbot conversion, according to some embodiments.

The implementation of data collection module 402 and recommendation module 408 heretofore form a basic flow 600 of a chatbot conversion depicted in FIG. 6A. When a conversation starts, user details of a user can be collected at operation 605, and the intent and slot values can be identified at operation 610. A slot value represents data of an entity. Based on the obtained user information, one or more options can be provided to the user at operation 615 and user feedback on the options can be received from the user at operation 620. According to the user feedback, an action (i.e., fulfillment action) can be taken by the chatbot to satisfy the user intent at operation 625.

FIG. 6B is an example illustration of the basic conversation flow depicted in FIG. 6A. FIG. 6B includes a table 650 showing a chatbot conversation about resort booking between an agent and a user. Other examples can be a user asking the chatbot which route is the best transportation route to arrive at a destination, a user inquiring about a procedure to get a certificate, etc. The first column of table 650 includes the actions of the agent. The second column of table 650 includes the reactions of the user. The first conversation turn as shown in the top two rows of table 650 indicates that a first intent 652 is "request_vacation," i.e., the user wants to book a resort. When this intent is identified, the agent asks the user about the time of visit, the number of visitors, location preference, etc. Each of these parameters is an entity, which is represented in a corresponding slot included in column 654. After taking a series of actions/inquiries, the agent provides four options in 656, and the user responds with a selected "resort_option 1" in 658. Based on this selection, another user intent 660 for booking the resort option 1 is identified. As a result, the agent takes the action to book a resort ticket for the user to fulfill the user's goal.

The options provided in FIGS. 6A and 6B are usually standard or predefined options that accommodate certain user goals with certain parameters. In many circumstances, one of these options may satisfy the user's goal. The user merely selects one of the options. In some embodiments, this selection can cause a positive reward (e.g., 662 in FIG. 6B) to be fed into an ML model for training. However, this basic conversation flow cannot learn from user behaviors over time. The drift of user behaviors, for example, a change of a user preference, is not considered and configured in such a basic conversation flow. Therefore, RL-based training is added to the present technical solution to recognize the user feedback on the fly and to optimize the agent's recommendation based on the user's preferences, thereby improving user experience in chat conversations with the objective of users leaving each conversation with a positive sentiment note.

Figures 7A, 7B, 7C:
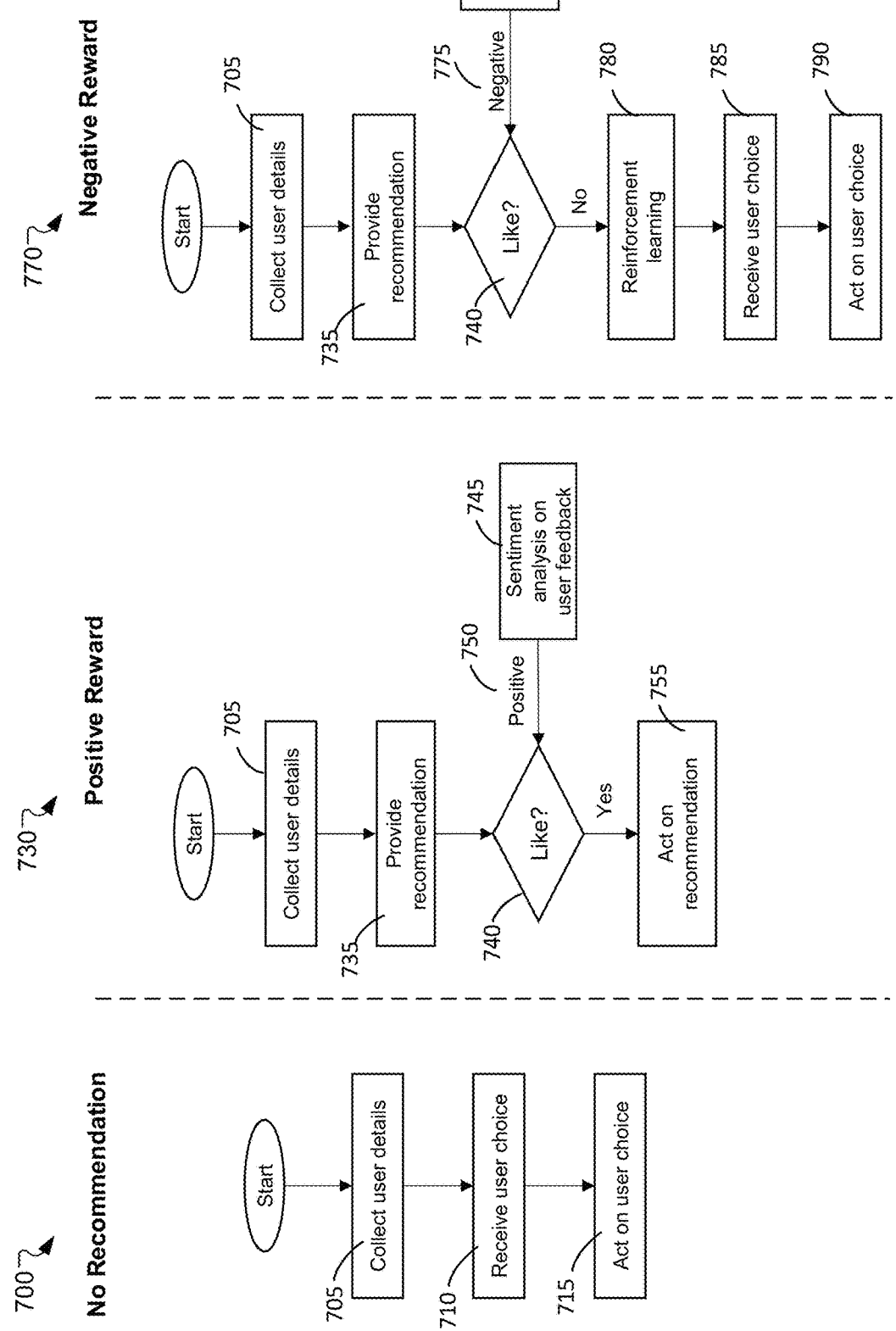
FIGS. 7A-7C illustrate three types of conversation flows, according to some embodiments.

FIGS. 7A-7C illustrate three types of conversation flows. In a chatbot conversation, an agent can interact with a user and respond to the user to meet the user's goal. When the user explicitly knows what he/she needs and provides explicit inputs, the chatbot agent can take action based on the user inputs and send a standard response (e.g., four resort options in FIG. 6B) to the user. Once the user accepts one choice (e.g., one of the four resort options), the agent merely acts on the user's choice (e.g., booking a ticket). There are no recommendations required in this scenario. This process is summarized in a flow 700 of FIG. 7A, which includes three steps: "collect user details" at 705, "receive user choice" at 710, and "act on user choice" at 715. This "no recommendation" scenario is also shown in FIG. 6A as a basic chatbot conversation flow.

The standard responses/options, however, do not always satisfy user's goals. For example, a user may not provide specific input or may have a specific need. In such a scenario, the chatbot agent needs to trigger a reinforcement learning mechanism to generate a recommendation as shown in operation 735 of FIGS. 7B and 7C. The user's reaction to the recommendation can be feedback with a positive reward or a negative reward, which is respectively described in FIGS. 7B and 7C.

If the user agrees to the recommendation provided by the agent, this recommendation is rewarded as a positive response. This is shown by flow 730 of FIG. 7B. Responsive to receiving the recommendation provided by the agent at operation 735 based on user details collected at operation 705, the user is asked whether he/she likes the recommendation at operation 740. If it is determined by sentiment analysis on user feedback at operation 745 that this is a positive reaction 750 from the user, flow 730 moves to operation 755, where the agent takes action based on the recommendation. Also, a positive reward is returned back to reinforcement learning models to indicate that the chatbot is in the right direction, and this recommendation can be kept for future use.

FIG. 7C shows a flow 770 when negative feedback is detected. Upon receiving the recommendation, at operation 740, the user is also asked whether he/she likes the recommendation. If the user is not interested in the recommendation (e.g., no reaction) or rejects the recommendation, the sentiment analysis on user feedback at operation 745 can identify this negative feedback 775 and move flow 770 to operation 780. At operation 780, the RL is performed to train and learn from the negative response. From the continuous training over a period of time, the recommendation can be changed, and new options can be generated. At operation 785, the user choice/selection of the updated recommendation/options can be received. As a result, the agent can take action based on the user choice at operation at 790. The flows in FIGS. 7B and 7C will be described in more detail below.

Referring back to FIG. 5, the self-correcting response generation process has a training phase 502 and an inferencing phase 552. In training phase 502, user feedback is identified from a chatbot conversion and is trained by one or more RL models. In inferencing phase 552, a recommendation is generated and self-corrected based on user details (e.g., user preferences) and the training result from RL models.

In some embodiments, data collection module 402 collects user data in a chatbot conversion at operation 504, and identifies an intent, and extracts entities from the collected user data at operation 506. Based on the intent, entities and other user data identified, at operation 508, feedback analyzer 404 identifies user feedback and contextually analyzes the identified feedback. Operation 508 further includes feedback analyzer 404 identifying feedback from a tail end at 510 and performing sentiment analysis at 512.

User feedback plays a significant role in enhancing the performance of a chatbot, but obtaining direct feedback from end-users can be very challenging. One way to collect feedback from the users is through a survey form at the end of a conversation session. However, most users choose to close the conversation session without filling out the survey. Due to the absence of explicit feedback, feedback analyzer 404 needs to use a reinforcement learning technique to analyze the user inputs from previous conversations and identify the user feedback.

In some embodiments, feedback analyzer 404 extracts a relevant section from the chat conversation to identify user feedback, for example, identifying feedback from the tail end of the conversation at operation 510. Feedback analyzer 404 can parse the entire conversion into three pieces: head, middle, and tail. For example, if the conversation has 150 lines, the tail may be the last 50 lines. Since in most of the conversations users with a specific goal leave feedbacks in the tail end, the tail end is relevant to feedback identification. Feedback analyzer 404 can further parse the tail end and identify the relevant conversation lines. These conversation lines have enough information about the user feedback.

At operation 512, feedback analyzer 404 performs sentiment analysis on the conversation lines in the tail end of the conversation to identify negative and positive sentiments or parts. If feedback analyzer 404 determines only positive sentiment(s) from the conversation lines, the recommendation presented by a chatbot agent to a user should not be changed. Therefore, next time when a user starts a conversation with the same or similar intent or goal, feedback analyzer 404 would notify the chatbot agent to regenerate the option with positive sentiment. However, if feedback analyzer 404 determines that the conversation lines in the tail end contain negative sentiment(s), this feedback will be used through reinforcement learning to change (i.e., self-correct) the response/recommendation provided by the chatbot agent. In some embodiments, one or more of the sequence of questions, the way that questions are phrased, the sequence of options in a recommendation, the options provided in a recommendation, or other factors related to a recommendation (e.g., patterns, formats) can be changed to self-correct a recommendation/response.

An RL model associates each option or choice of a response with a reward score. Feedback analyzer 404 calculates the reward score for each option/choice based on sentiment analysis. Different mechanisms can be used to calculate a reward score can be calculated. In some embodiments, a conversation includes a direct indication regarding whether a given option or choice is accepted. If an option is accepted, feedback analyzer 404 can calculate a reward score to represent a positive reward. If an option is rejected, feedback analyzer 404 can calculate a reward score to represent a negative reward. In other embodiments, a conversation ends when an end goal is not achieved, but the user closes the conversation with a note or feedback. In this case, feedback analyzer 404 calculates a sentiment score based on sentiment analysis of the tail-end including the user note/feedback. Feedback analyzer 404 uses this sentiment score as a reward score for one or more options presented in the conversation. In yet other embodiments, feedback analyzer 404 can assign a positive reward to a neutral feedback (e.g., when a user does not leave a note and ends a conversation earlier than a usual end). In some embodiments, a negative reward score is configured to be lower than a positive reward score. The negative reward score is associated with negative feedback or option with negative reward, while the positive reward is associated with positive feedback or option with a positive reward.

Once the reward scores are determined, feedback analyzer 404 feeds these scores into RL engine 406. At operation 514, RL engine 406 trains one or more RL models based on these scores along with previous user inputs, previous recommendations, and any other information identified from the user's prior conversations. The training is used to update the policy, i.e., a probability of the user selecting an option for a specific set of inputs. When each user feedback is fed into the RL models, RL engine 406 retrains the RL models to enhance the probability of an option being selected. As a result, a chatbot becomes more efficient by learning through conversations and continuous user feedback.

RL engine 406 automatically trains user feedback. For example, RL engine 406 may instruct a chatbot agent to ask users about their preferred choices, and automatically take user's answers into RL models for training and learning. After repeatedly learning, the information from the set of user inputs will be learned, and an optimized recommendation will be provided.

In some embodiments, when training the RL models, RL engine 406 modifies the weight associated with a recommendation or option based on a corresponding negative or positive reward. If a negative reward score is received, RL engine 406 can lower down the weight of the corresponding recommendation/option. When a particular recommendation/option is repeatedly assigned negative rewards, its weight will be repeatedly decreased. Eventually, when the weight turns to zero or is lower than a threshold number, RL engine 406 can notify recommendation module 408 to stop or remove this recommendation. On the other hand, if a recommendation often receives positive feedbacks, the corresponding positive rewards may level up its weight and priority, and in turn, the recommendation may receive more positive feedbacks, thereby optimizing user experience.

Once a training result based on user feedback learning is generated, inferencing phase 552 in FIG. 5 starts. With the user details received at operation 554 and the training result received from RL-based modelling at operation 514, recommendation module 408 can adjust and generate a recommendation including one or more options to end-users at operation 556. For example, recommendation module 408 can self—correct the options by changing one or more of the sequence of questions, the way that questions are phrased, the sequence of options in the recommendation, the options provided in the recommendation, or other factors (e.g., patterns, formats) related to the recommendation.

Since the RL learning is based on user inputs, reward scores, and every other parameter derived from a conversation, the recommendation determined based on the RL learning can learn from user behaviors and get self-corrected. In practice, a single negative feedback will not change a recommendation or option to guarantee the actual improvement of the recommendation. The recommendation is improved based on the behaviors of users over time (e.g., many users do not like the option) rather than based on an individual user's personal opinion. In some embodiments, recommendation module 408 communicates with RL engine 406 to configure the parameters used in RL training such as how long an option can be removed, how long the historical conversation data can be considered, how often a model should be reconfigured. Further, in some embodiments, the recommendation change persists. When a new user having the same or similar intent starts a chatbot conversation, the chatbot agent would provide the changed recommendation to the new user.

To generate recommendations based on the best user experience and learning from a user's real—time behavior, in some embodiments, after recommendation module 408 provides a recommendation to the end-user, model monitoring module 410 monitors the user's reaction and sent it back to RL engine 406. RL engine 406 uses the new information to retrain ML/RL models, which ensures the continuous improvement of the models and helps optimize options based on the received contextual information, RL engine 406 identifies the best option based on user behavior and reward scores across all users.

Figure 8A:
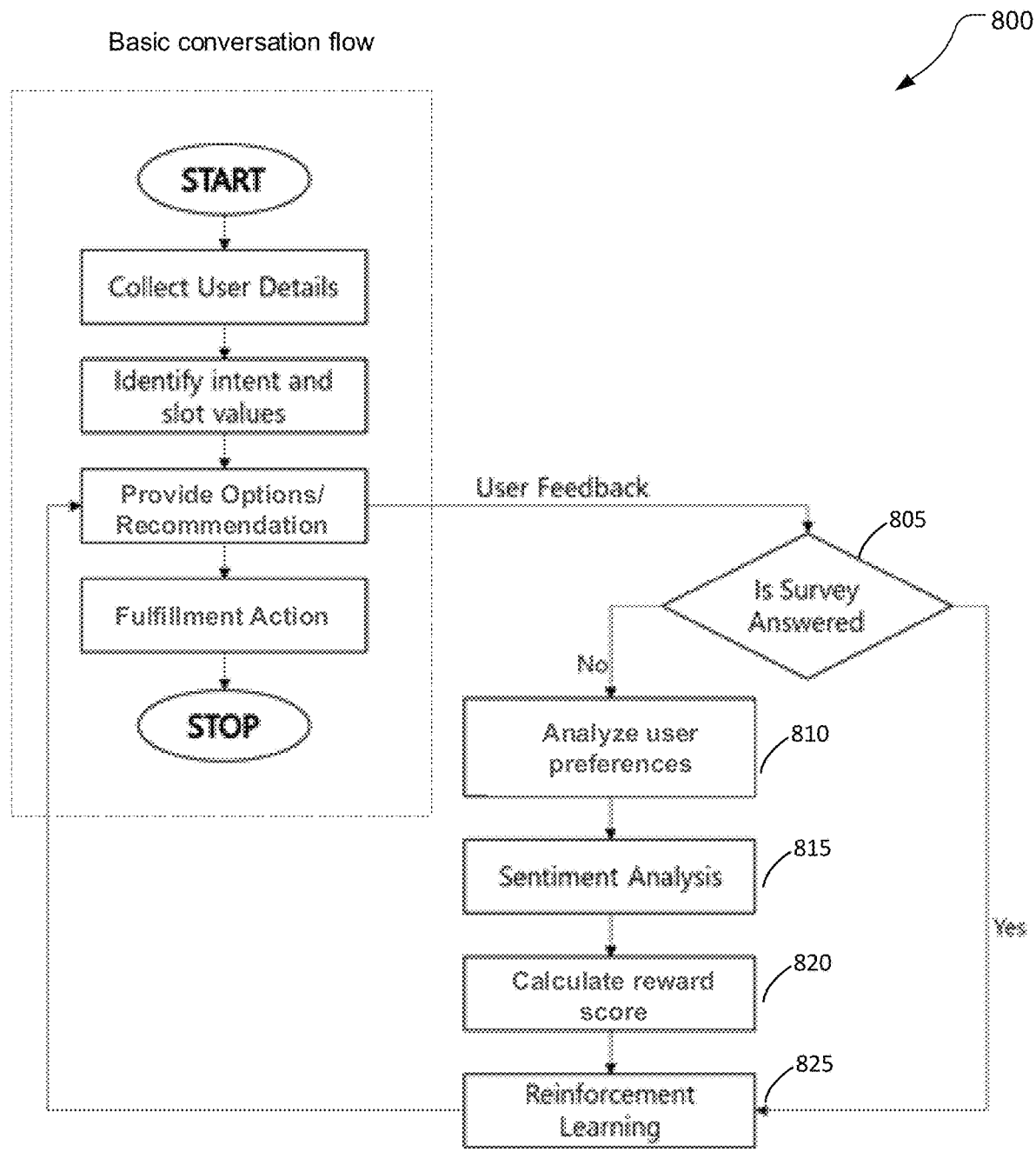
FIG. 8A illustrates a flow of a chatbot conversion with RL-based learning from user feedback, according to some embodiments.

In some embodiments, model monitoring module 410 detects that a new user feedback to a new recommendation is received at operation 558. The new recommendation can be different from the current recommendation over a period of time. Model monitoring module 410 sends the new feedback to RL engine 406 to start model retraining. Model retraining updates the reward scores based on the choices made by the user. Model retraining accommodates all the changes received at the user level and reflects these changes in the next set of predictions. Therefore, the time for model retraining depends upon the number of updates collected over time. However, since model retraining is an offline process, it does not impact the amount of time used for generating responses for new conversations, FIG. 8A illustrates a flow 800 of a chatbot conversion with RL-based learning from user feedback. Flow 800 includes two portions. The portion included in the dash-lined box is a basic chatbot conversation depicted in FIG. 6A, which will not be repeatedly described here. The rest of flow 800 focuses on reinforcement training and learning based on user feedback. When a chatbot response or recommendation is presented to a user, a survey collecting user feedback about the recommendation is sent to the user. As depicted, at operation 805, it is determined whether the survey is answered. If the user filled out the survey, i.e., user feedback is received, flow 800 moves to operation 825 to add this feedback into RL models for reinforcement learning. However, if no answer to the survey is received, flow 800 moves to operation 810 to analyze user preferences received from the chatbot conversion. The user preferences can be analyzed based on sentiment analysis at operation 815. For example, the user's conversation may be parsed to determine a tail end. The conversion lines in the tail end are further parsed and analyzed based on sentiment and context analysis. At operation 820, a reward score of the recommendation is determined based on the sentiment analysis. The reward score indicates that the feedback is either negative or positive. The reward score as well as other information such as user preferences, user inputs, etc., are fed into one or more RL models to perform RL learning at operation 825. The learning result is returned back to impact the recommendation generation.

Reinforcement learning plays a vital role to analyze the historical chatbot conversations of a user and predict the taste/choice of the user. Advantageously, the recommendation provided based on the user's past behavior increases the subsequent acceptance level from the user. Reinforcement learning counts in all preceding actions that were taken by the chatbot. For example, all responses and rewards received are tracked into the environment, and whether an action needs to repeat is determined based on this environment. Accordingly, a more meaningful response can be delivered.

FIG. 8B is an example illustration of an RL-based conversation learning flow depicted in FIG. 8A. FIG. 8B includes a table 850, where the chatbot conversation with a user about resort booking shown in FIG. 6B includes a different choice from the user. In FIG. 6B, the user accepts one of the offered options and a positive reward is fed into RL models to indicate that the options can be recreated in future similar conversations. In FIG. 8B, however, the user does not select any originally offered options. Instead, the user indicates that he/she needs an additional room. This answer is taken as a negative feedback and scored with a negative reward in 852 based on sentiment analysis. The negative score in 852 is used by the RL models to learn and determine whether and what change needs to be done. Accordingly, alternative self-corrected options in 854 are provided to the user. These options are different from the original options in FIG. 6B in the number and order of options. The user's feedback to this new option list is also monitored. When it is determined that the user accepted one option, this acceptance is taken as a positive feedback and causes a positive reward in 856 to be fed into the RL models to retrain the models, so that the new options may be recreated next time. In this illustration, the recommendation is changed responsive to one negative feedback. In practice, the recommendation is usually changed after a period of time of receiving a certain number of negative feedback from a certain number of users. These numbers are configurable based on the context of a chatbot conversation.

Figure 9A:
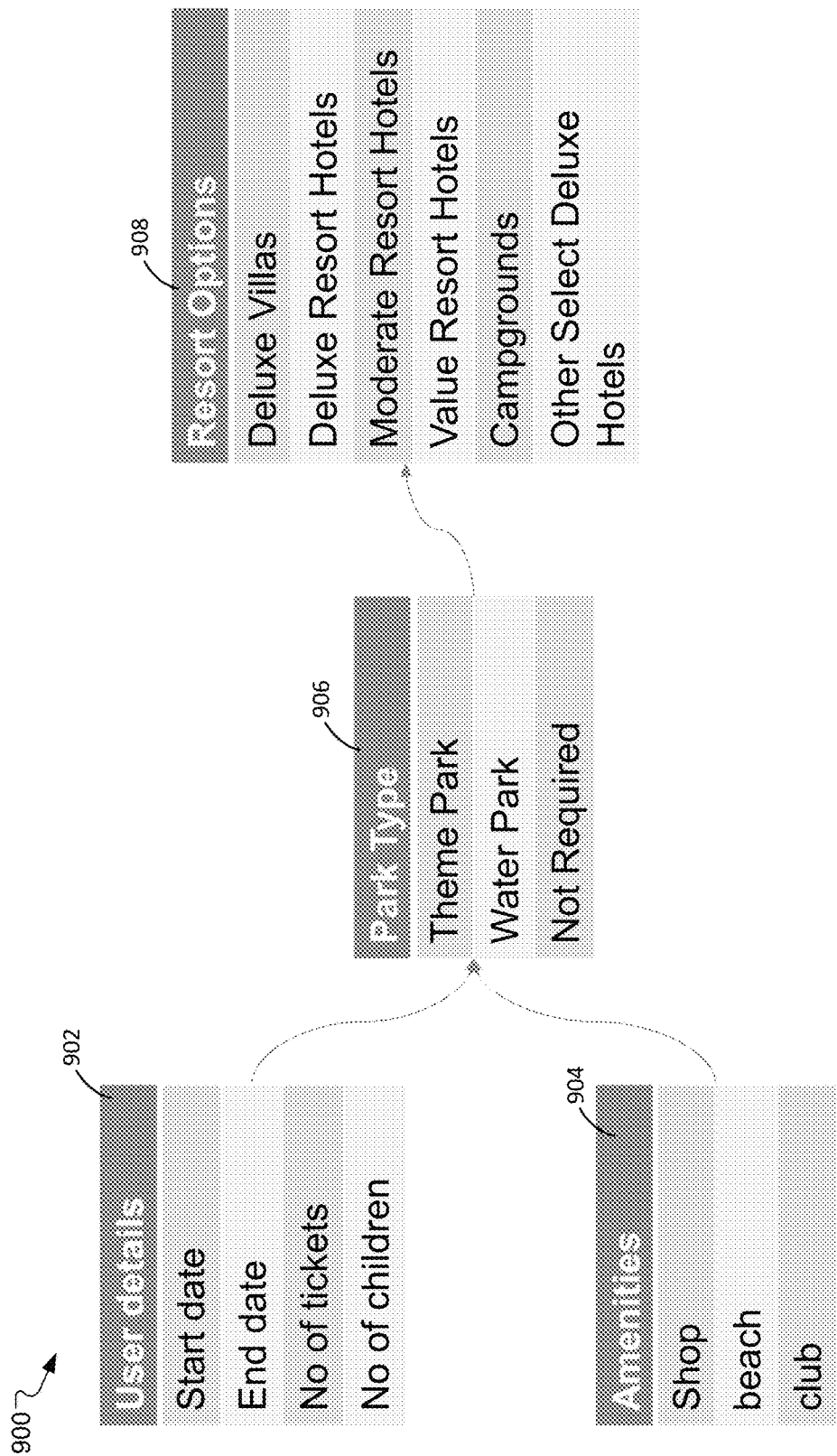
FIG. 9A illustrates an example response generation process in a chatbot conversation, according to some embodiments.

FIGS. 9A-9D illustrate an RL-based chatbot conversation. FIG. 9A shows an example response generation process 900 in a chatbot conversation. Suppose a user intends to plan a resort visit. User details 902 such as start date, end date, number of tickets, and number of children are collected. This data along with the amenity information 904 provided by the user is used for a chatbot agent to ask what park type 906 that the user prefers. Based on the data collected from 902-906, some resort options 908 can be provided to the user. Depending on the user's answers/choices in each of 902-908, RL training and learning may or may not be needed in generating a response that meets the user's goal.

Figure 9B:
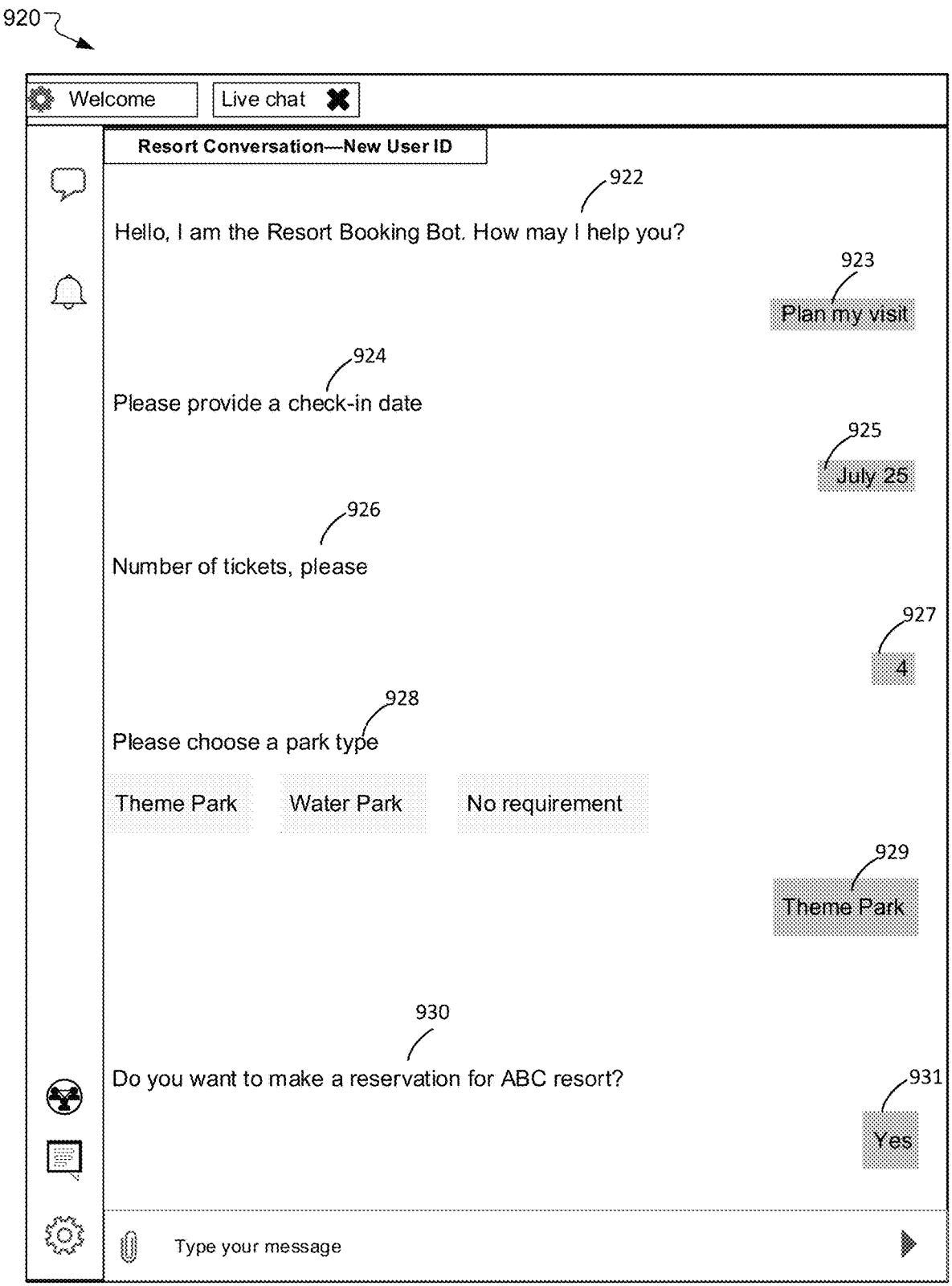
FIG. 9B illustrates an exemplary user interface of a basic response generation process, according to some embodiments.

FIG. 9B shows an exemplary user interface 920 of a basic response generation process. The chatbot agent asks questions 922-928 and the user answers in 923-929. In this way, the user data is collected, which allows the agent to propose a resort option 930 to the user. When the user accepts this option in 931, the response generation process ends. In this basic flow, no RL learning is involved.

Figure 9C:
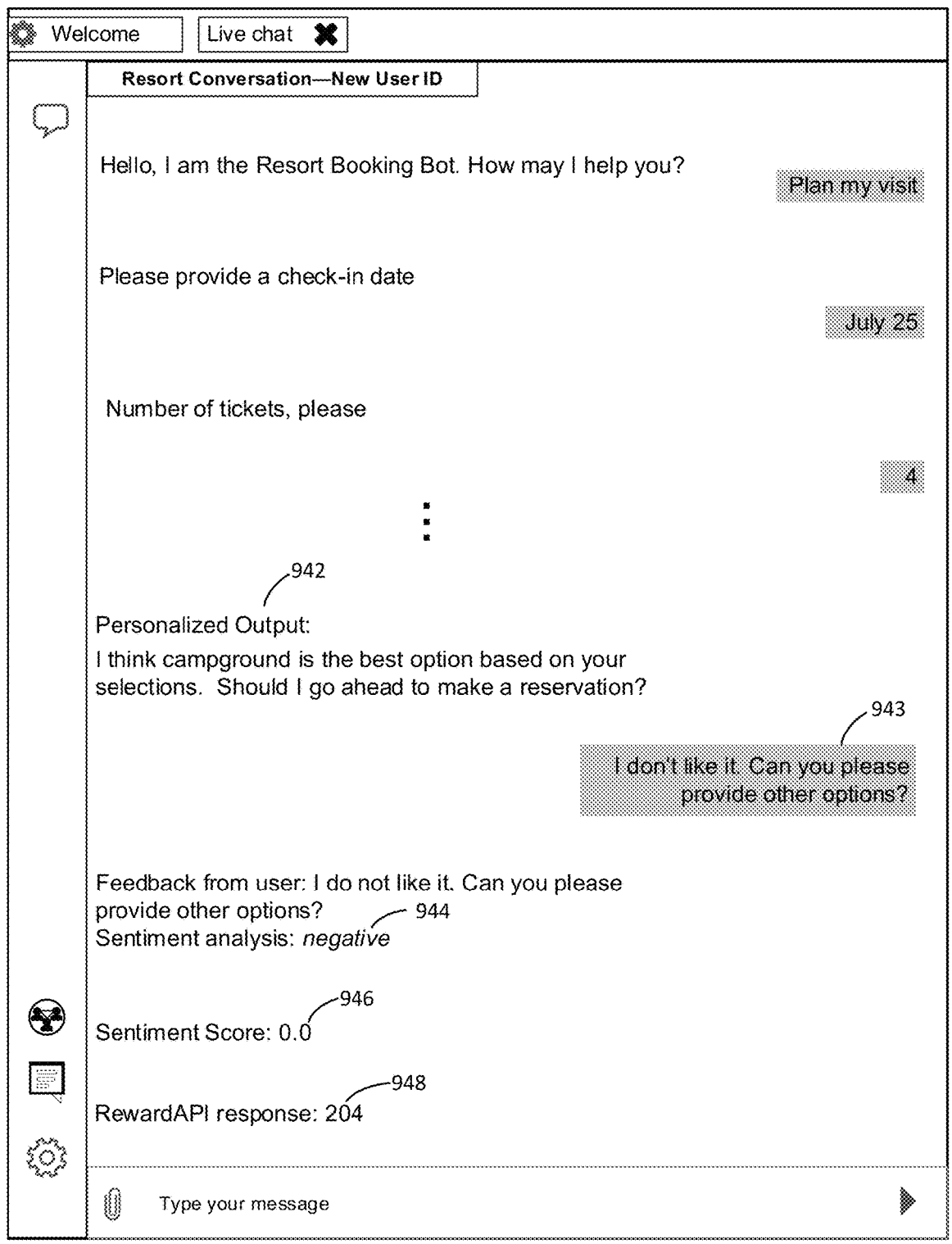
FIGS. 9C and 9D illustrate exemplary user interfaces of an enhanced response generation process based on RL learning, according to some embodiments.
Figure 9D:
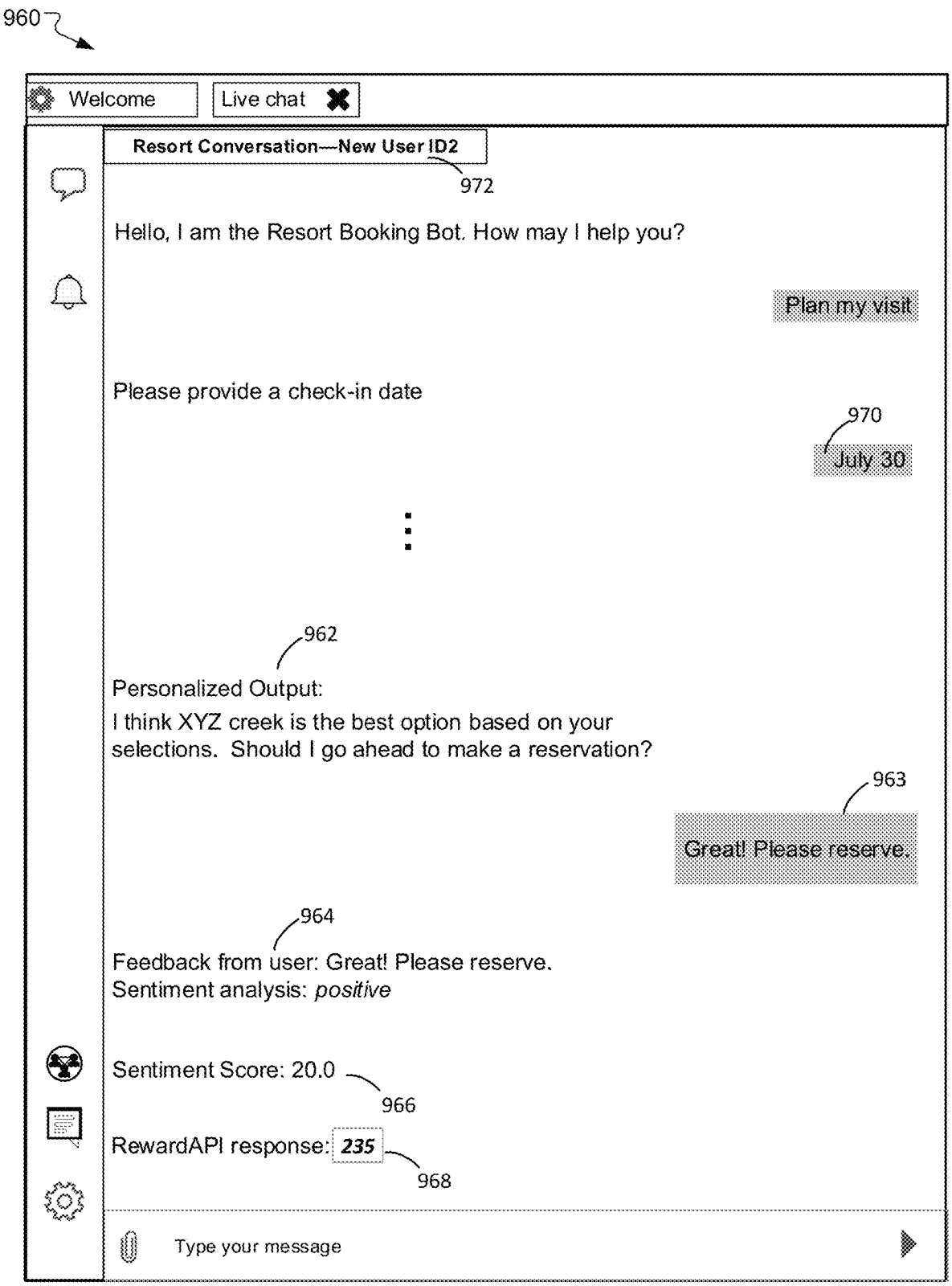

FIGS. 9C and 9D show exemplary user interfaces of an enhanced response generation process based on RL learning. As shown in user interface 940 of FIG. 9C, based on user data collected for planning a resort for a user, the chatbot agent cannot find a predefined option for the user. The chatbot agent, therefore, needs to provide a recommendation of a campground in 942 to the user, for example, based on the machine learning. This recommendation provision triggers RL learning. Since the user indicates in 943 that he/she does not like the campground recommendation, the sentiment analysis shows that a negative feedback 944 is received and calculates the corresponding reward scores in 946 and 948. These scores are then sent back to RL models to learn. Later, as shown in user interface 960 of FIG. 9D, a new recommendation of XYZ creek in 962 is provided to the user. Based on the user feedback in 963, the sentiment analysis determines that a positive feedback 964 is received and updates the corresponding reward scores in 966 and 968. This new recommendation can be provided in subsequent similar conversations (e.g., as indicated in 970) for this or other users (e.g., as indicated in 972).

Figure 10:
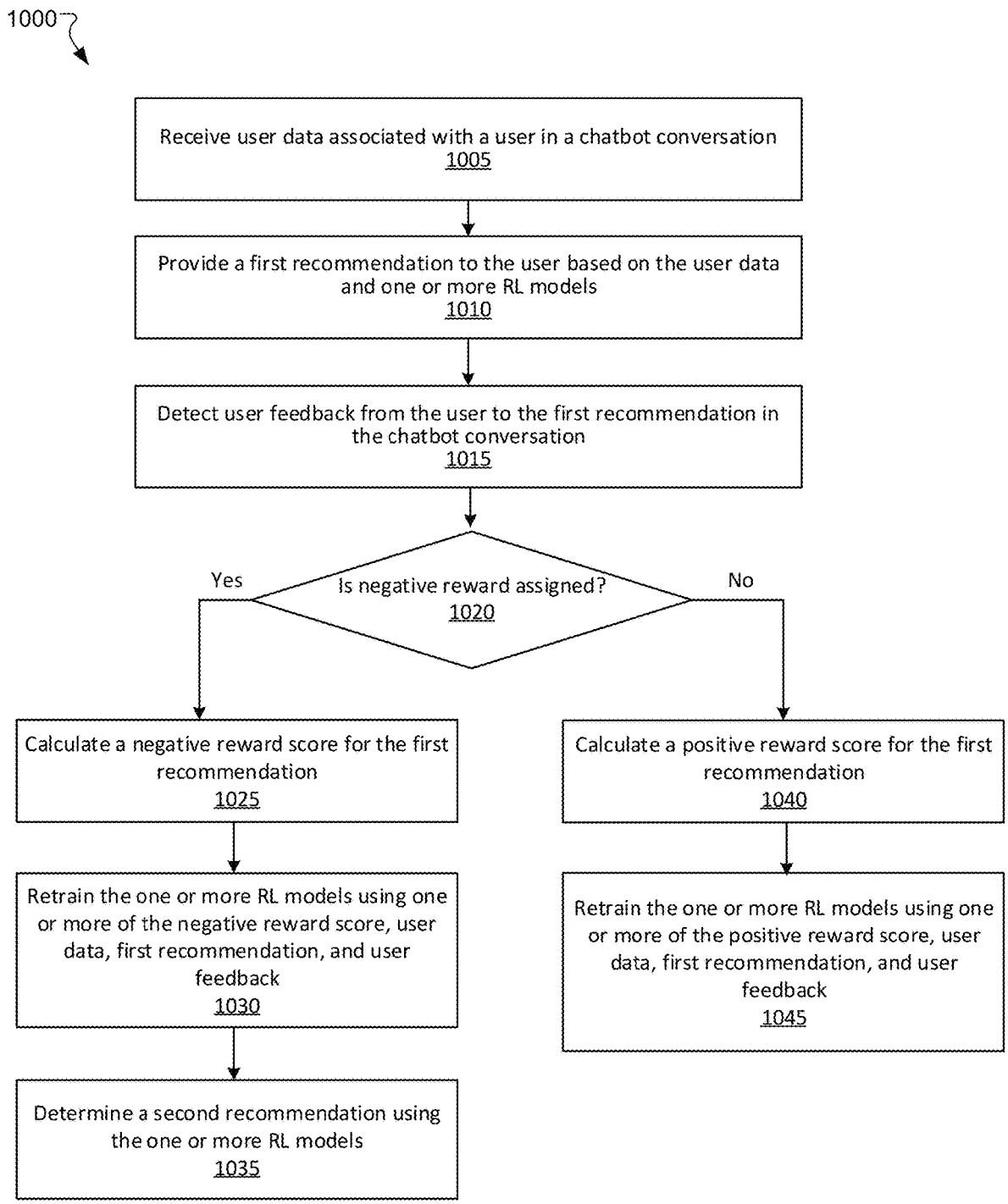
FIG. 10 illustrates an exemplary process for generating and correcting chatbot responses based on reinforcement learning, according to some embodiments.

FIG. 10 illustrates an exemplary process 1000 for generating and correcting chatbot responses based on reinforcement learning (RL), according to some embodiments. In some embodiments, self-correcting chatbot application 322 of server 320 as depicted in FIG. 4 in communication with other components of system 300 to implement process 1000. At operation 1005, self-correcting chatbot application 322 receives user data associated with a user in a chatbot conversation. The user data includes one or more of user inputs, user intents, user preferences, and other information that relates to achieving a specific goal of the user. In some embodiments, to obtain the user data, self-correcting chatbot application 322 identifies an intent of the user and extracts entities in the chatbot conversation based on natural language understanding. The entities can include one or more of parameters, replies, and choices associated with the chatbot conversation.

At operation 1010, self-correcting chatbot application 322 provides a first recommendation to the user based on the user data and one or more RL models. At operation 1015, self-correcting chatbot application 322 detects user feedback from the user to the first recommendation in the chatbot conversation. To detect the user feedback, self-correcting chatbot application 322 can split the chatbot conversation into multiple conversations pieces, where one of the conversation pieces includes a tail end of the conversation and parses the tail end to conversation lines.

At operation 1020, self-correcting chatbot application 322 determines whether to assign a positive reward or a negative reward to the user feedback based on sentiment analysis performed on the user feedback. The self-correcting chatbot application 322 can perform the sentiment analysis on the conversation lines of the tail end to determine whether to assign a positive reward or a negative reward.

Responsive to assigning the negative reward to the user feedback, self-correcting chatbot application 322 calculates a negative reward score for the first recommendation at operation 1025. Self-correcting chatbot application 322 also retrains, at operation 1030, the one or more RL models using one or more of the negative reward score, the user data, the first recommendation, and the user feedback. Self-correcting chatbot application 322 further determines, at operation 1035, a second recommendation using the one or more RL models. To determine the second recommendation, self-correcting chatbot application 322 can decrease a weight associated with the first recommendation each time when a new negative reward score for the first recommendation is added to the one or more RL models, and remove the first recommendation when the weight associated with the first recommendation is lower than a threshold number. In some embodiments, self-correcting chatbot application 322 modifies the first recommendation to obtain the second recommendation. The modification may be based on the training of the one or more RL models using user feedback from a plurality of users over a period of time.

Responsive to assigning the positive reward to the user feedback, self-correcting chatbot application 322 calculates a positive reward score for the first recommendation at operation 1040. In addition, at operation 1045, self-correcting chatbot application 322 can retrain the one or more RL models using one or more of the positive reward score, the user data, the first recommendation, and the user feedback.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component.

Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated and described with the figures above. Modules may constitute either software modules (e.g., code embodied on a machine-readable medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processors) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that includes a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" is employed to describe elements and components of the embodiments herein. This is done merely for convenience and to give a general sense of the claimed invention. This description should be read to include one or at least one and the singular also includes the plural unless it is obvious that it is meant otherwise.

Upon reading this disclosure, those of skill in the art will appreciate still additional alternative structural and functional designs for the system described above. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for generating and correcting chatbot responses based on reinforcement learning (RL), the method comprising:
   receiving user data associated with a user in a chatbot conversation;
   providing a first recommendation to the user based on the user data and one or more RL models;
   detecting user feedback to the first recommendation in the chatbot conversation;
   determining whether to assign a positive reward or a negative reward to the user feedback based on sentiment analysis performed on the user feedback;
   calculating a negative or positive reward score for the first recommendation based on the positive or negative reward assigned to the user feedback;
   retraining the one or more RL models using the reward score, the user data, the first recommendation, and the user feedback, the user data including user preference changes over time; and
   modifying the first recommendation to generate a second recommendation using the one or more retrained RL models when the negative reward is assigned to the user feedback of the first recommendation, wherein the first recommendation continues to be used in retraining the one or more RL models until a condition of the one or more RL models is met.

2. The method of claim 1, wherein modifying the first recommendation to generate the second recommendation comprises at least one of modifying a sequence of questions that led to the first recommendation, rephrasing one or more of the questions, modifying one or more options in the first recommendation, or modifying a pattern or format of the first recommendation.

3. The method of claim 1, wherein modifying the first recommendation to generate the second recommendation using the one or more retrained RL models comprises:
   decreasing a weight associated with the first recommendation each time when a new negative reward score for the first recommendation is added to the one or more RL models; and
   removing the first recommendation when the weight associated with the first recommendation is lower than a threshold number.

4. The method of claim 1, further comprising retraining the one or more RL models each time when new user feedback for the first recommendation is received.

5. The method of claim 1, wherein modifying the first recommendation to generate the second recommendation is based on training the one or more RL models using user feedback from a plurality of users over a period of time.

6. The method of claim 1, further comprising determining whether to provide the first recommendation prior to providing the first recommendation.

7. The method of claim 1, wherein detecting the user feedback to the first recommendation comprises:
   splitting the chatbot conversation into multiple conversations pieces, one of the conversation pieces including a tail end of the chatbot conversation; and
   parsing the tail end of the chatbot conversation into conversation lines to identify the user feedback.

8. The method of claim 7, further comprising performing the sentiment analysis on the conversation lines to determine whether to assign the positive reward or the negative reward to the user feedback.

9. The method of claim 1, wherein receiving the user data comprises identifying an intent of the user and extracting entities in the chatbot conversation based on natural language understanding, wherein the entities include one or more of parameters, replies, and choices associated with the chatbot conversation.

10. A system for generating and correcting chatbot responses based on reinforcement learning (RL), the system comprising:
    a processor; and
    a memory in communication with the processor and comprising instructions which, when executed by the processor, program the processor to:
      receive user data associated with a user in a chatbot conversation;
      provide a first recommendation to the user based on the user data and one or more RL models;
      detect user feedback to the first recommendation in the chatbot conversation;
      determine whether to assign a positive reward or a negative reward to the user feedback based on sentiment analysis performed on the user feedback;
      calculate a negative or positive reward score for the first recommendation based on the positive or negative reward assigned to the user feedback;
      retrain the one or more RL models using the reward score, the user data, the first recommendation, and the user feedback, the user data including user preference changes over time; and
      modify the first recommendation to generate a second recommendation using the one or more retrained RL models when the negative reward is assigned to the user feedback of the first recommendation, wherein the first recommendation continues to be used in retraining the one or more RL models until a condition of the one or more RL models is met.

11. The system of claim 10, wherein to modify the first recommendation to generate the second recommendation the instructions further program the processor to perform at least one of modifying a sequence of questions that led to the first recommendation, rephrasing one or more of the questions, modifying one or more options in the first recommendation, or modifying a pattern or format of the first recommendation.

12. The system of claim 10, wherein, to modify the first recommendation to generate the second recommendation using the one or more retrained RL models, the instructions further program the processor to:
  decrease a weight associated with the first recommendation each time when a new negative reward score for the first recommendation is added to the one or more RL models; and
  remove the first recommendation when the weight associated with the first recommendation is lower than a threshold number.

13. The system of claim 10, wherein the instructions further program the processor to retrain the one or more RL models each time when new user feedback for the first recommendation is received.

14. The system of claim 10, wherein modifying the first recommendation to generate the second recommendation is based on training the one or more RL models using user feedback from a plurality of users over a period of time.

15. The system of claim 10, wherein the instructions further program the processor to determine whether to provide the first recommendation prior to providing the first recommendation.

16. The system of claim 10, wherein to detect the user feedback to the first recommendation the instructions, further program the processor to:
  split the chatbot conversation into multiple conversations pieces, one of the conversation pieces including a tail end of the chatbot conversation; and
  parse the tail end of the chatbot conversation into conversation lines to identify the user feedback.

17. The system of claim 16, wherein the instructions further program the processor to perform the sentiment analysis on the conversation lines to determine whether to assign the positive reward or the negative reward to the user feedback.

18. The system of claim 10, wherein to detect the user feedback to the first recommendation the instructions, further program the processor to identify an intent of the user and extract entities in the chatbot conversation based on natural language understanding, wherein the entities include one or more of parameters, replies, and choices associated with the chatbot conversation.

19. A computer program product for generating and correcting chatbot responses based on reinforcement learning (RL), the computer program product comprising a non-transitory computer-readable medium having computer readable program code stored thereon, the computer readable program code configured to:
  receive user data associated with a user in a chatbot conversation;
  provide a first recommendation to the user based on the user data and one or more RL models;
  detect user feedback to the first recommendation in the chatbot conversation;
  determine whether to assign a positive reward or a negative reward to the user feedback based on sentiment analysis performed on the user feedback;
  calculate a negative or positive reward score for the first recommendation based on the positive or negative reward assigned to the user feedback;
  retrain the one or more RL models using the reward score, the user data, the first recommendation, and the user feedback, the user data including user preference changes over time; and
  modify the first recommendation to generate a second recommendation using the one or more retrained RL models when the negative reward is assigned to the user feedback of the first recommendation, wherein the first recommendation continues to be used in retraining the one or more RL models until a condition of the one or more RL models is met.

20. The computer program product of claim 19, wherein to modify the first recommendation to generate the second recommendation, the computer readable program code is further configured to perform at least one of modifying a sequence of questions that led to the first recommendation, rephrasing one or more of the questions, modifying one or more options in the first recommendation, or modifying a pattern or format of the first recommendation.

* * * * *